(12) United States Patent
Judovits et al.

(10) Patent No.: US 8,263,695 B2
(45) Date of Patent: Sep. 11, 2012

(54) POLYVINYLIDENE FLUORIDE HAVING AN INCREASED MELTING POINT

(75) Inventors: Lawrence H. Judovits, Collegeville, PA (US); Nicholas J. Rodak, Princeton, NJ (US); Saeid Zerafati, Villanova, PA (US); Ravi R. Gupta, Pottstown, PA (US)

(73) Assignee: Arkema Inc., King of Prussia, PA (US)

( * ) Notice: Subject to any disclaimer, the term of this patent is extended or adjusted under 35 U.S.C. 154(b) by 713 days.

(21) Appl. No.: 12/158,439

(22) PCT Filed: Dec. 20, 2006

(86) PCT No.: PCT/US2006/048643
§ 371 (c)(1),
(2), (4) Date: Jun. 20, 2008

(87) PCT Pub. No.: WO2007/145668
PCT Pub. Date: Dec. 21, 2007

(65) Prior Publication Data
US 2008/0281031 A1    Nov. 13, 2008

Related U.S. Application Data

(60) Provisional application No. 60/751,952, filed on Dec. 20, 2005.

(51) Int. Cl.
*C08K 3/34* (2006.01)
(52) U.S. Cl. .................. 524/445; 526/255
(58) Field of Classification Search .............. 524/445; 526/255
See application file for complete search history.

(56) References Cited

U.S. PATENT DOCUMENTS

| | | | | |
|---|---|---|---|---|
| 5,962,553 | A * | 10/1999 | Ellsworth | 523/216 |
| 6,310,141 | B1 * | 10/2001 | Chen et al. | 525/199 |
| 6,610,766 | B1 | 8/2003 | Kitamura et al. | |
| 6,610,807 | B2 * | 8/2003 | Duchesne et al. | 526/250 |
| 7,400,490 | B2 * | 7/2008 | Gunderman et al. | 361/502 |
| 2004/0242752 | A1 * | 12/2004 | Fujioka et al. | 524/445 |
| 2005/0014900 | A1 * | 1/2005 | Park | 525/191 |

FOREIGN PATENT DOCUMENTS

JP   2005/350579   12/2005
WO   WO-2007/145668 A2 * 12/2007

OTHER PUBLICATIONS

L. Priya, J. P. Jog, "Polymorphism in Intercalated Poly(vinylidene fluoride)/Clay Nanocomposites", Dec. 4, 2002, Journal of Applied Polymer Science, vol. 89, pp. 2036-2040 (2003) Wiley Periodicals, Inc.*

(Continued)

*Primary Examiner* — Peter D. Mulcahy
*Assistant Examiner* — Henry Hu
(74) *Attorney, Agent, or Firm* — Thomas F. Roland

(57) ABSTRACT

The invention relates to compositions of polyvinylidene fluoride (PVDF) and its copolymers that have been modified with an onium salt. The PVDF compositions exhibit an increased melting point, a reduced heat distortion and piezo properties. The improved properties can be further enhanced through annealing, and/or the addition of nanoclays. Additionally, the combination of PVDF, nanoclays and annealing can also produce a PVDF with an increased melting point and piezoelectric properties.

8 Claims, 10 Drawing Sheets

OTHER PUBLICATIONS

Geng, Chengzhen. et al.. "New piezoelectric damping composities of poly(vinylidene fluoride) blended with clay and multi-walled carbon nanotubes"—2012 Society of Chemical Industry, Polym Int. (2012) wileyonlinelibrary.com/journal/pi.

Lopes. A., et al., Nucleation of the electroactive gamma phase and enhancement of the optical transpaarency in low filler content poly(vinylidene) clay nanocomposites—The Journal of Physical Chemistry, C. 2011, 115, 18076-18082.

* cited by examiner

DSC of the 2nd heat
K741/1.5% Organic Salt Blends

TGA in air of K741/salt blends

Comparison of K740/Salt Blends; 1 Hz, 5°C/min

—— Kynar 740 -- annealed
—△— 0.5 % Tetrabutyl ammonium hexafluorophosphate -- annealed
—□— 0.5 % Stearyl triphenyl phosphonium bromide -- annealed
—◇— 0.5 % Ethyl triphenyl phosphonium bromide -- annealed Low Shear Effect

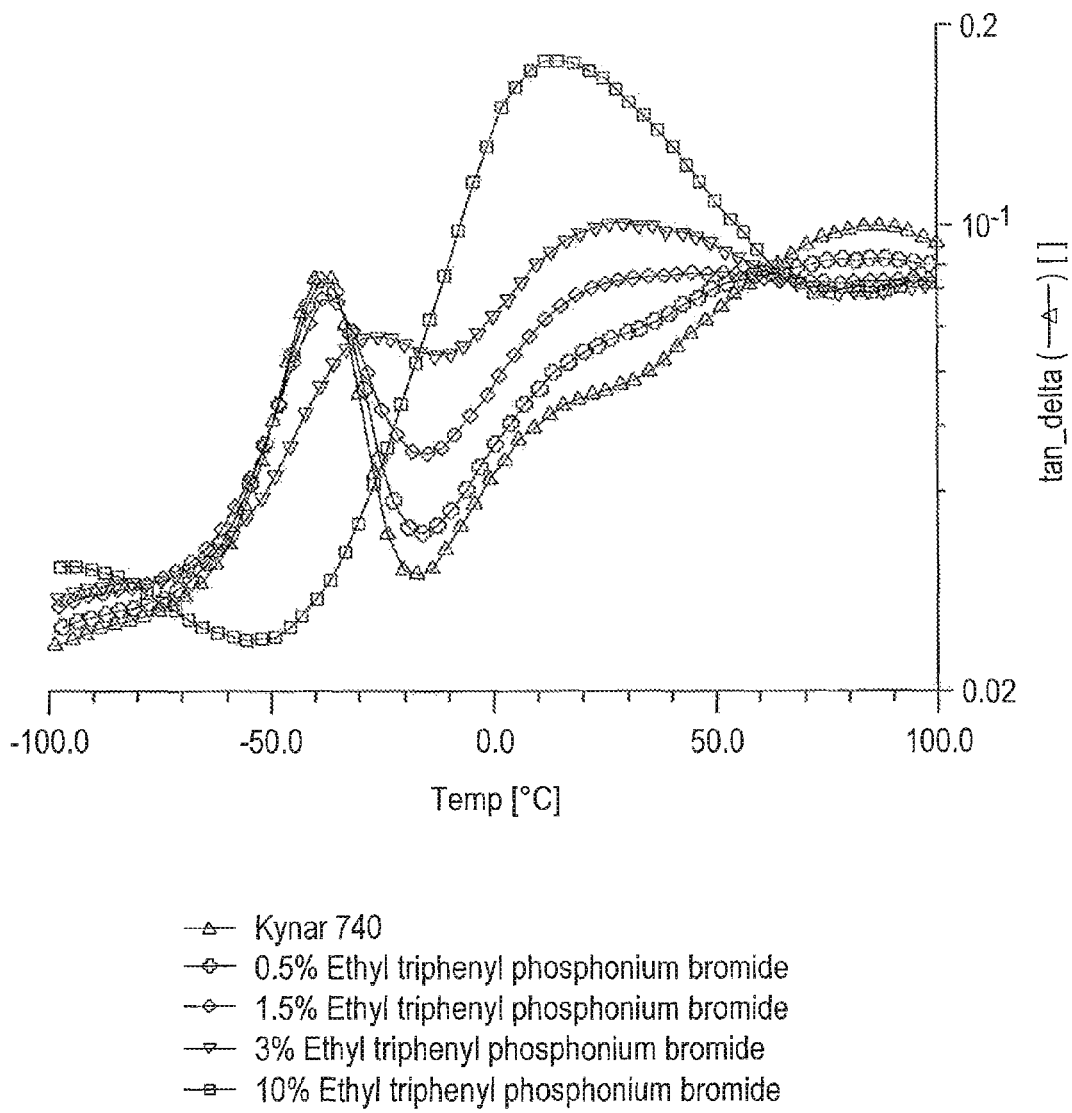

POLYVINYLIDENE FLUORIDE HAVING AN INCREASED MELTING POINT

This application claims benefit, under U.S.C. §119 or §365 of; U.S. 60/751,952, filed Dec. 20, 2005; and PCT/US2006/048643 filed Dec. 20, 2006.

FIELD OF THE INVENTION

The invention relates to compositions of polyvinylidene fluoride (PVDF) and its copolymers that have been modified with an onium salt. The PVDF compositions exhibit an increased melting point, a reduced heat distortion, better clarity and piezoelectric properties. The improved properties can be further enhanced through annealing and/or the addition of nanoclays. Additionally, the combination of PVDF, nanoclays and annealing can also produce a PVDF with an increased melting point and piezoelectric properties.

BACKGROUND OF THE INVENTION

The melting point of polyvinylidene fluoride (PVDF) has been noted to increase when nucleated with clay modified functionalized ammonium cations (J. Priya, J. P. Jog, J. Appl. Polym. Sci., 2003, 89, 2036). The PVDF nanocomposites were studied under annealing conditions of 125° C. and 185° C. for 24 hours at atmospheric pressure.

WO 98/10012 discloses the modification of layered clays by organophosphonium cations as the intercalating agent to increase the thermal stability of the nanocomposite clay, which can then be melt-blended as a modifier into high melting point polymers.

U.S. Pat. No. 6,610,766 describes the use of alkyl quaternary ammonium sulfates and sulfites as an organic salt additives for PVDF. The Examples show the use of tetrabutyl ammonium hydrogen sulfide. No mention of the increase in ductile properties is made.

Japanese patent application JP2005350579A describes the use of nitrogen containing onium salts for antistatic applications in many different resins.

SUMMARY OF THE INVENTION

The invention relates to a high-melting point polyvinylidene fluoride composition comprising:
a) a polyvinylidene fluoride polymer, copolymer or terpolymer, and
b) from 100 ppm to 10.0 weight percent of one or more onium salts, based on the weight of the polyvinylidene fluoride polymer.

The invention further relates to a process for improving the melt properties or piezo electric properties of a polyvinylidene fluoride polymer or copolymer comprising the step of:
a) admixing a polyvinylidene fluoride polymer, copolymer or terpolymer with either 100 ppm to 10 weight percent of onium salts or 0.1 to 20 weight percent of an organically-modified nanoclay, the percentage being based on the total sum of the PVDF polymer onium salts and nanoclay; percent of a modified nanoclay; and
b) annealing said admixture for at least 1 minute, within the melting region of the resin, this range being between 130 to 180° C. for the homopolymer or 75 to 180° C. for the copolymers or terpolymers.

BRIEF DESCRIPTION OF THE DRAWINGS

FIGS. 9 and 10 show the effect on melting point (decreases) and glass transition (increases) with increases in the level of onium salts in the modified PVDF.

DETAILED DESCRIPTION OF THE INVENTION

Figure 1:
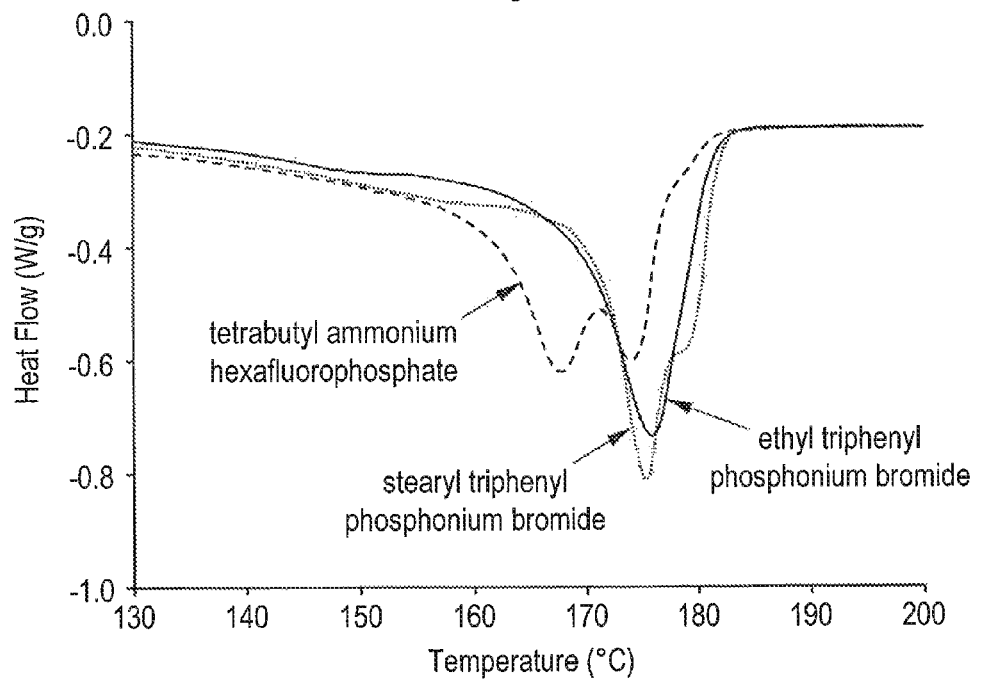
FIG. 1 is a plot of the differential scanning calorimeter trace for the $2^{nd}$ heat for different onium salt/PVDF blends of the Examples.

The invention relates to polyvinylidene fluoride (PVDF) and its copolymers that have been modified with an onium salt. The invention also relates to a process of annealing a modified PVDF to improve the melting point and other properties.

Polyvinylidene Fluoride (PVDF)

Polyvinylidene fluoride (PVDF) polymers useful in the present invention include the homopolymer made by polymerizing vinylidene fluoride (VDF), and copolymers, terpolymers and higher polymers of vinylidene fluoride wherein the vinylidene fluoride units comprise greater than 70 percent of the total weight of all the monomer units in the polymer, and more preferably, comprise greater than 75 percent of the total weight of the units. The term polyvinylidene fluoride polymer, and acronym "PVDF" is used herein to refer to both the homopolymer, copolymer and terpolymer. A preferred copolymer contains from about 71 to 99 weight percent VDF, and correspondingly from about 1 to 29 percent hexafluoropropylene (HFP) (such as disclosed in U.S. Pat. No. 3,178,399, incorporated herein by reference). A preferred terpolymer is the terpolymer of VDF, HFP and tetrafluoroethylene (TFE).

Onium Salt

The onium salts to be admixed with PVDF directly, or used to first organically modify the individual clay platelet surfaces followed by admixing with PVDF, include but are not limited to phosphonium, imidazolium, and ammonium organic salts. The salts used may be prepared by typical synthetic methods such as nucleophilic substitution of an alkyl or aryl halide, with subsequent anion exchange such as solution or resins and in several forms, i.e. with or without clay platelet intercalation as described below. The onium salts useful in the invention have the formula:

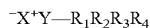

where X is an anionic center that may be a simple halogen anion such as iodide, bromide, chloride, or fluoride or a complex organic carboxylate anion such as acetate or succinate, or benzoate or terephthalate, or a complex inorganic anion such as hexafluorophosphate, sulfate, tetrafluoroborate, or an aluminosilicate; Y is a cationic center formed from the addition of radicals that create four bonds to that center and may be either a heterocyclic imidazolium $^+N{=}R_1$ $(R_2R_3)$, a quaternary ammonium, $^+NR_1R_2R_3R_4$, or a phosphonium $^+PR_1R_2R_3R_4$; and $R_1$, $R_2$, $R_3$, and $R_4$ are each individually H or a $C_{1-20}$ group selected from alkyl, aryl, alkylaryl, alkylaryl radicals. Moreover, the radicals $R_1$, $R_2$, $R_3$, and $R_4$ may bear one or more of oxygen, nitrogen, sulfur, and phosphorus centers wherein the onium cation may therefore contain functionality such as alcohol, carboxylic acid, ester, amide or other that may augment the desirable effects imparted by the onium salt additive. Specific examples of such salts include: ethyl triphenyl phosphonium bromide, stearyl triphenyl phosphonium bromide, and tetrabutyl ammonium hexafluorophosphate.

The onium salt maybe blended with the PVDF by several means, including but not limited to known methods of melt blending or solution blending. In one embodiment the organic salt is mixed with PVDF in a melt-extruder.

The onium salt is present in the composition at from 100 ppm to 10 and preferably 0.3 to 8 weight percent, based on the weight of the PVDF polymer.

The blend of onium salt and PVDF was found to impart a higher heat distortion and thermal stability to the PVDF.

The onium salt PVDF blend was found to increase the melting point of a PVDF homopolymer from 168 to 170° C. to between 178 to 180° C.

In one embodiment of the invention, the TGA heat stability of the tetrabutyl ammonium hexafluorophosphate salt by itself is found to be much higher than that of the tetrabutyl ammonium hydrogen sulfide salt.

Annealing

It has been found that annealing of the onium salt/PVDF in the melting region of the PVDF or PVDF copolymer can be used to fine-tune the crystal phase, and further improve the melt properties of the onium salt /PVDF blend. The improvement seen depends on the annealing conditions—especially time and temperature. The onium salts are both discrete, small molecules and are typically more thermally stable and therefore produce a film possessing a higher clarity than that derived from other PVDF modifiers, such as clays. [Note that the lower clarity obtained from the use of organically-modified clays is NOT due to a lower thermal stability as implied here. The lower clarity results from a clay particle size on the order of the wavelength of light that gives rise to scatter and reduced optical clarity. If either complete exfoliation of the clay particles or particles (aggregates) with dimensions smaller than the wavelength of light are used, scatter would not results from the additive, but maybe by some other mechanism such as crystallite size and distribution, etc.]

It is known that the melting point of PVDF can be raised when the PVDF is nucleated with a nanoclay that has been modified with functionalized ammonium cations. These clays can be modified as described in US patent application US 2006/0211803 incorporated herein by reference, in which the clay is modified with a cationic alkoxyamine is disposed between the layers.

It has now been found that annealing of the nanoclay modified PVDF in the melting region can further improve the melting properties, in a manner similar to that described above for the annealing of an onium salt-modified PVDF. The nanoclay is present in the PVDF blend at from 100 ppm to 20 weight percent and preferably at from 0.3 to 8 weight percent, based on the weight of the PVDF.

In one embodiment the annealing of the PVDF/onium salt or PVDF nanoclay compositions involves heating for at least 5 minutes within the melting region of the polymer. The melting range of a PVDF homopolymer is generally in the range of 130 to 180° C. The melting point range for PVDF copolymers and terpolymers is generally in the range of 75 to 180° C. In another embodiment, it was found that a short annealing procedure for a PVDF/onium salt composition of 1 minute at 170° C. resulted in a higher melting point of the composition.

The melting temperature of PVDF can be increased at least up to 15° C. above its typical melting temperature. Short conditioning times above 180° C. followed by a moderate cooling can also result in a 176° C. melting material. Annealing at 170° C. results in increasing the melting peak temperature above 176° C. Depending upon annealing time melting peak temperatures of 185° C. can be noted.

Two different effects are noted in the invention. At low levels of PVDF modification, such as below 1% by weight, an increased melting point is noted. At higher loading levelsum salts of on a reduction in modulus is seen.

The PVDF that has been modified with either an onium salt, or a modified clay, and then annealed is found to exhibit an increase in its melting temperature. A higher melting point PVDF would allow for use of PVDF in more demanding, higher temperature applications not achievable with current materials, additives, and processing technologies. Also, the PVDF modified with the onium additives described herein exhibits a decrease in modulus (below 150° C.) and an increase in ductility with increasing concentration of the salt. Additionally, phase changes were noted, and a PVDF bearing a significantly greater content of the highly piezoelectric β cystalline phase was obtained without stretching of the material under poled conditions. Such additives as described above and the resultant properties enhancements should allow the production of piezoelectric films under simplified and more flexible processing without having to stretch the material. While not being bound to any particular theory, it is believed the improved properties are caused by the inducement of a higher melting crystalline form in the PVDF.

Figure 8:
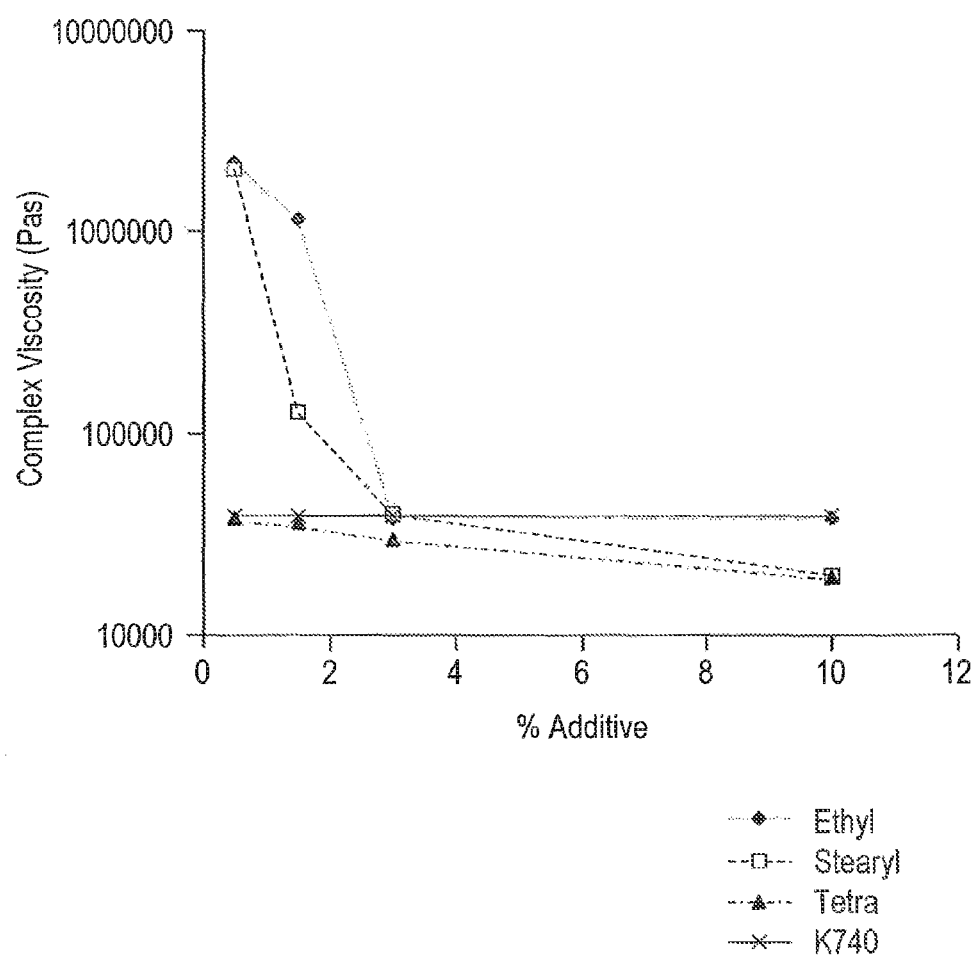
FIG. 8 shows the low shear effect, comparing PVDF modified with both alkyl and aryl onium salts.
Figure 9:
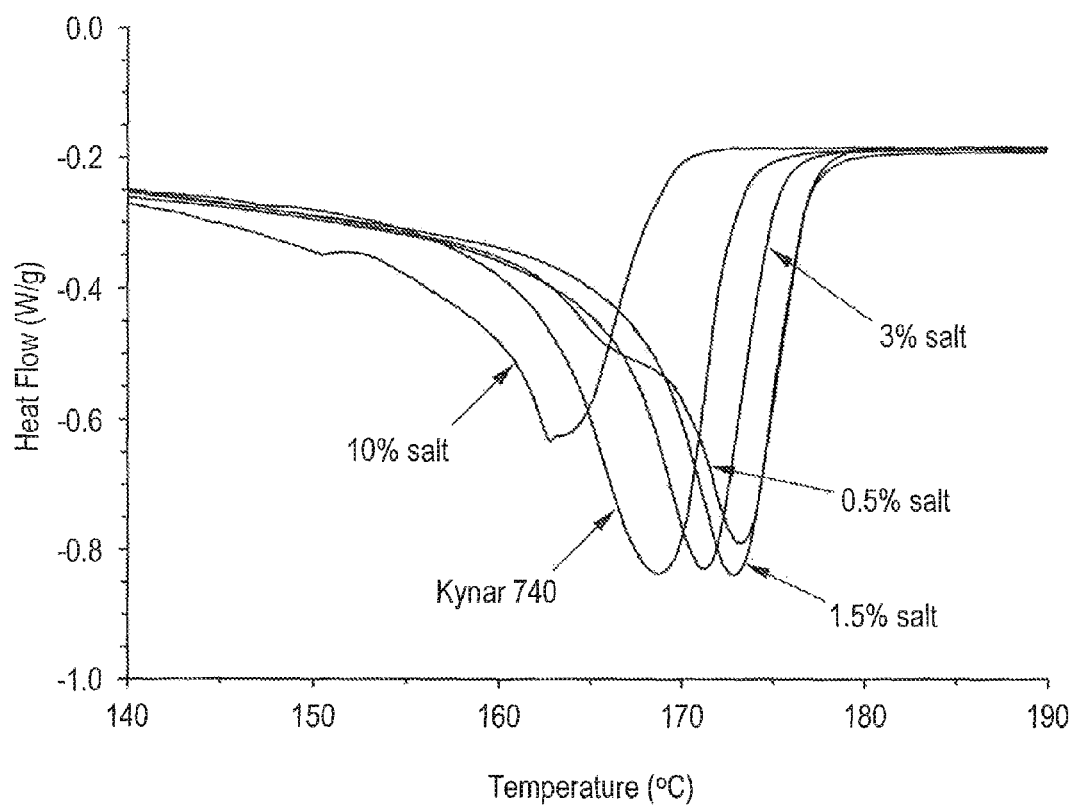

One particularly interesting effect observed was a low shear effect at low concentration for aryl onium salts. The association effect was noted for the alkyl triphenyl phosphonium salts with PVDF, in particular ethyl triphenyl phosphonium bromide and stearyl triphenyl phosphonium bromide, that at low levels of the salt there was an increase in their effect on the low shear viscosity of PVDF. This was not noted for the tetrabutyl ammonium hexafluorophosphate. This can be noted in the attached FIGS. 5-8. While not being bound to any theory, it is believed that this is due to the delocalization of the charge around the cation phenyl rings interacting with the PVDF fluorines resulting in a physical crosslinking effect between the chains. This effect appeared to occur at from 50 ppm to 3% of the aryl onium based on the PVDF matix. For 0.5% of the salt additive, one can see in FIG. 8 below a dramatic increase in the low shear viscosity at 0.01 rad/s for blends of the alkyl triphenyl phosphonium salts with PVDF compared to the Kynar 740 (PVDF) control as well as to the alkyl quaternary ammonium salt/PVDF blend.

The modified PVDF compositions of the invention may further contain other typical additives including, but are not limited to, pigments, fillers, extenders, plasticizers, impact modifiers or additives to improve aging resistance, and UV stabilizers.

Uses for the modified PVDF include, but are not limited to: a heat release film for epoxy circuit boards. The piezoelectric effect found in the modified materials can lead to uses for noise abatement, such as in a coating for windows; for vibrational dampening, and even to provide stealth technology. One of skill in the art can imagine many other uses for a PVDF having the improved properties as described herein.

EXAMPLES

Example 1

Figure 2:
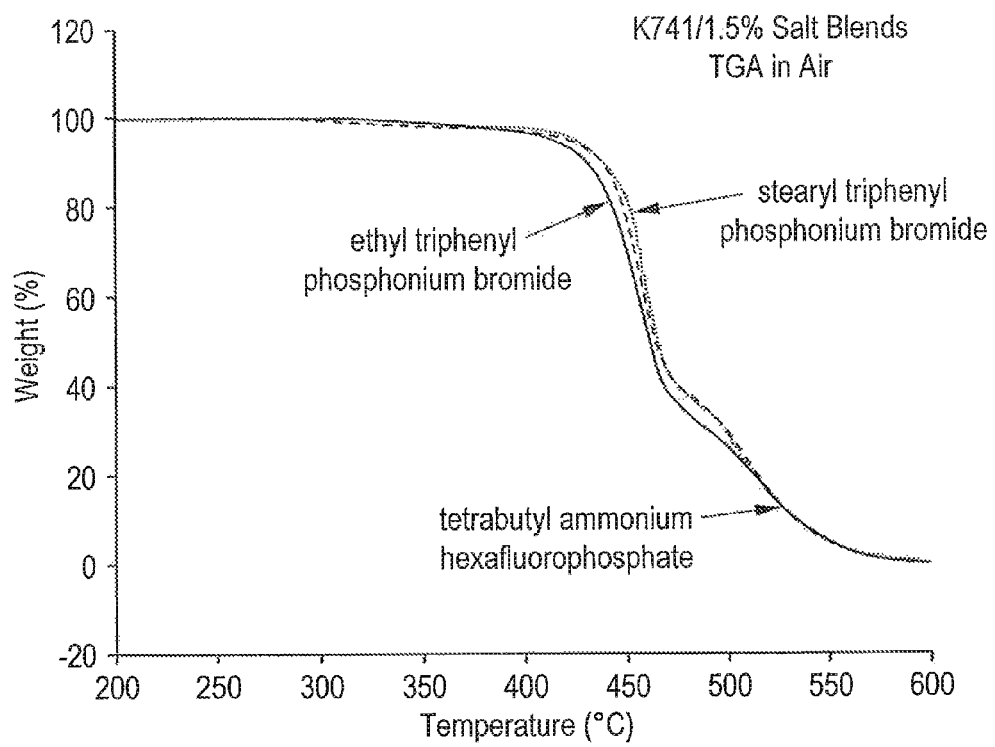
FIG. 2 is a TGA plot in air for different onium salt/PVDF blends of the Examples.
Figure 3:
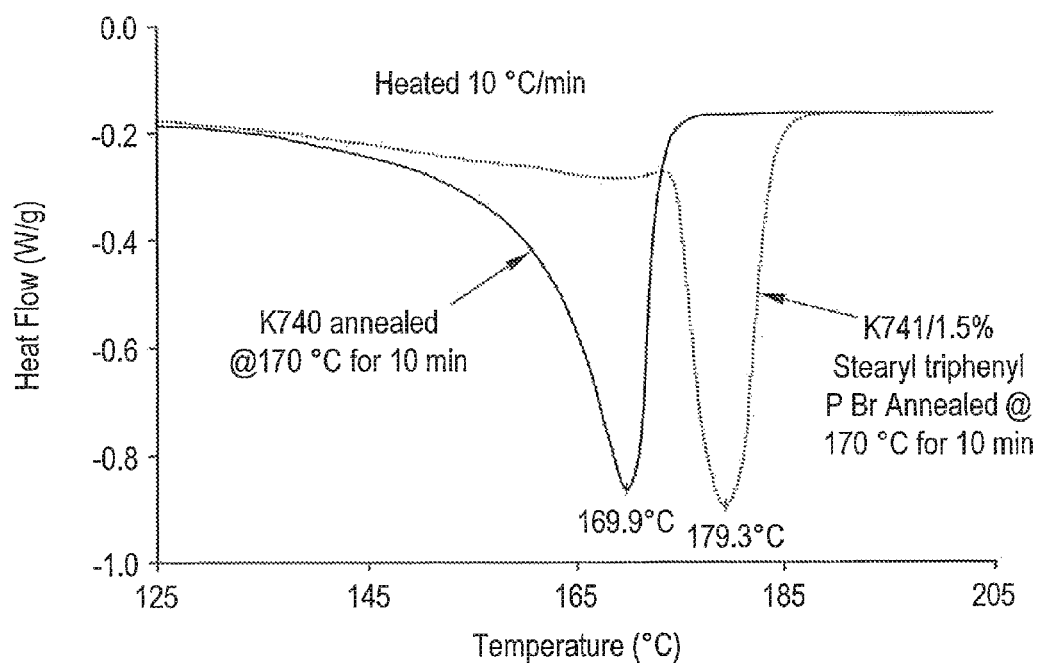
FIG. 3 shows concentration effects of unmodified, alkyl onium modified and aryl onium modified PVDF.

Blends of KYNAR 741 polyvinylidene fluoride (Arkema Inc.) and 1.5 weight percent of different onium salts were formed by melt blending at 220° C. for 5 minutes the KYNAR 741 with each of ethyl triphenyl phosponium bromide, stearyl triphenyl phosphonium bromide, and tetrabutyl ammonium hexafluorophosphate respectively. The blends were pressed into thin sheets by compression at 200° C. No plate out was noted in any sample. All melting points of the additives are kept close to or below the KYNAR processing conditions to allow a better dispersion. The thermal stability of all the salts were evaluated and found to be above the KYNAR processing temperature as well as the TGA of the blend material as given below. The DSC of the $2^{nd}$ heat, and TGA in air are shown in FIGS. 1 and 2. The effect of annealing for the stearyl triphenyl phosphonium salt blend versus an unmodified PVDF is shown in FIG. 3.

Example 2

Blends of 1.5 weight percent CLOISITE 20A (a natural montmorillonite modified with a quaternary ammonium salt) from Southern Clay Products, Inc. with KYNAR 740 (Arkema Inc.) were combined in a Werner Pfleiderer 30 mm twin screw at 450° F. under a blanket of nitrogen. The blend was analyzed by Differential Scanning Calorimetry (DSC). The DSC sample was heated to 210° C., cooled 10° C./min and then reheated 10° C./min. The reheat melting peak temperature was 176° C. compared to the resin base's peak temperature of 168° C. An increase in the recrystallization temperature of 11° C. was also noted as compared to the reference KYNAR 740. Thus the additive acts as both a nucleating agent and a heat distortion additive.

Example 3

Samples of a PVDF film (KYNAR 740), a PVDF (KYNAR 740) containing 1.5 weight percent of a nanocomposite clay, CLOISITE 20A a natural montmorillonite modified with a quaternary ammonium salt, from Southern Clay Products, Inc was annealed overnight (16 hours) at 170° C. were measured for $d_{33}$ piezoelectric coefficients by use of the dynamic method. A force acts periodically on the film and the charge is measured directly via a sensitive charge amplifier. The piezoelectric coefficient is then calculated from the relation $d_{33}=Q/F$. All measurements were performed on non-stretched films. All samples were evaporated with aluminum electrodes (area 1 $cm^3$) and poled in direct contact under ambient conditions. All poling fields were above the known coercive field of PVDF (60 MV/m at room temperature). Five measurements were taken on five or six samples of each material. The mean values are:

| | |
|---|---|
| PVDF | $d_{33}$ = 2.1 pC/N |
| PVDF with 1.5 wt % clay, non-annealed | $d_{33}$ = 0.41 pC/N |
| PVDF with 1.5 wt % clay, annealed | $d_{33}$ = 6.8 pC/N |

All films were non-stretched. Non-stretched PVDF is crystallized in the alpha form that is non-polar. Thus only low piezoelectric coefficients are expected. The results show that for non-stretched PVDF, the piezoelectric response is reduced by the addition of clay, but enhanced by addition of clay followed by annealing.

Example 4

Blends of 0.5, 1.5, 3, 10 weight percent salts were combined in a Werner Pfleiderer twin screw at 450° C. with PVDF Kynar 740. The lower weight percent blends were diluted from a 10 percent master batch blend. The salts used were ethyl triphenyl phosphonium bromide, stearyl triphenyl phosphonium bromide, and tetrabutyl hexafluorophosphate. PVDF samples blended with the onium compounds are listed in Table 1. All samples were injection molded into bars. Values in parentheses are standard deviations. All specimens were conditioned at 50% RH and 23° C. greater than 48 hours prior to testing. All testing was performed in a laboratory maintained at 50% RH and 23° C. Tensile properties were tested following ASTM test method D 638 using type I specimens and a crosshead speed of 2"/min. Flexural properties were tested following ASTM test method D 790 using ⅛" specimens, a span of 2", and a crosshead speed of 0.05"/min. Impact properties were tested according to ASTM D 256 using ⅛" specimens. n=5 for all tensile and flexural testing, n=10 for impact strength testing.

As listed in Table 1 a change in mechanical properties is noted. The tensile modulus decreases but the ductility increases.

Examples 5, 6, 7 refer to the blends in example 4.

TABLE 1

| Sample | Tensile Strength @ Yield, psi, ASTM D 638 | Tensile Stress @ Break, psi, ASTM D 638 | Elongation @ Yield, %, ASTM D 638 | Break Elongation, %, ASTM D 638 | Flexural Modulus, Tangent, psi, ASTM D 790 | Flexural Stress @ Yield, psi, ASTM D 790 |
|---|---|---|---|---|---|---|
| 0.5% Ethyl triphenyl phosphonium bromide | 6520 (30) | 4960 (140) | 16.5 (0.2) | 75 (21) | 177880 (2220) | 7610 (100) |
| 1.5% Ethyl triphenyl phosphonium bromide | 6350 (40) | 4920 (60) | 18.1 (0.1) | 117 (27) | 163700 (1560) | 7120 (20) |
| 3.0% Ethyl triphenyl phosphonium bromide | 6070 (30) | 4800 (40) | 19.4 (0.2) | 110 (22) | 142630 (1940) | 6450 (30) |
| 0.5% Stearyl Ethyl triphenyl phosphonium bromide | 6840 (30) | 5180 (40) | 16.2 (0.1) | 71 (16) | 176830 (1410) | 7580 (70) |
| 1.5% Stearyl Ethyl triphenyl phosphonium bromide | 6620 (50) | 5080 (130) | 18.4 (0.2) | 77 (22) | 159330 (1350) | 6960 (20) |

TABLE 1-continued

| Sample | Tensile Strength @ Yield, psi, ASTM D 638 | Tensile Stress @ Break, psi, ASTM D 638 | Elongation @ Yield, %, ASTM D 638 | Break Elongation, %, ASTM D 638 | Flexural Modulus, Tangent, psi, ASTM D 790 | Flexural Stress @ Yield, psi, ASTM D 790 |
|---|---|---|---|---|---|---|
| 3.0% Stearyl Ethyl triphenyl phosphonium bromide | 6350 (30) | 5000 (160) | 20.7 (0.3) | 107 (29) | 139040 (1350) | 6230 (10) |
| 0.5% Tetrabutyl ammonium hexafluorophosphate | 7000 (20) | 5180 (90) | 15.3 (0.1) | 77 (23) | 184310 (1560) | 8050 (50) |
| 1.5% Tetrabutyl ammonium hexafluorophosphate | 6730 (20) | 5110 (110) | 18.0 (0.1) | 94 (26) | 161010 (1610) | 7160 (20) |
| 3.0% Tetrabutyl ammonium hexafluorophosphate | 6370 (30) | 5300 (90) | 20.3 (0.2) | 127 (25) | 137530 (1440) | 6340 (20) |
| Kynar 740 Control | 7080 (40) | 4790 (130) | 9.7 (0.3) | 66 (8) | 217010 (1080) | 9560 (50) |

Example 5

Figure 4:
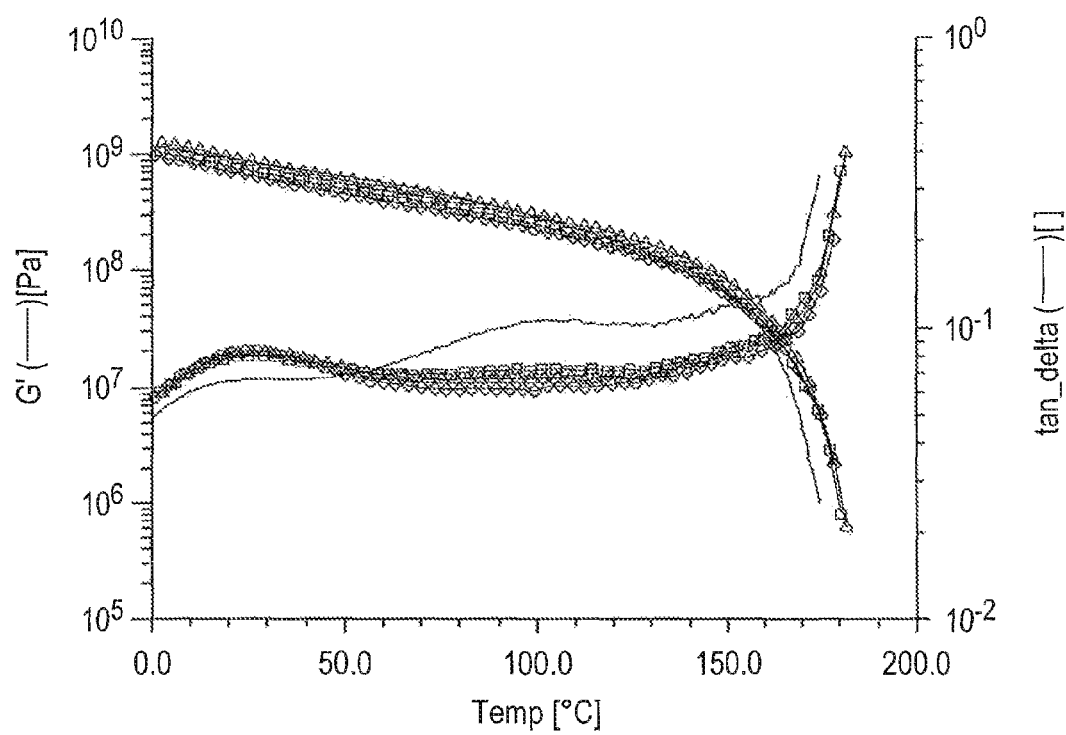
FIG. 4, compares the dynamic mechanical analysis of annealed samples with and without onium salts. A higher temperature modulus can be seen in the sample containing onium salt as compared to the control that contained no salt.
Figure 5:
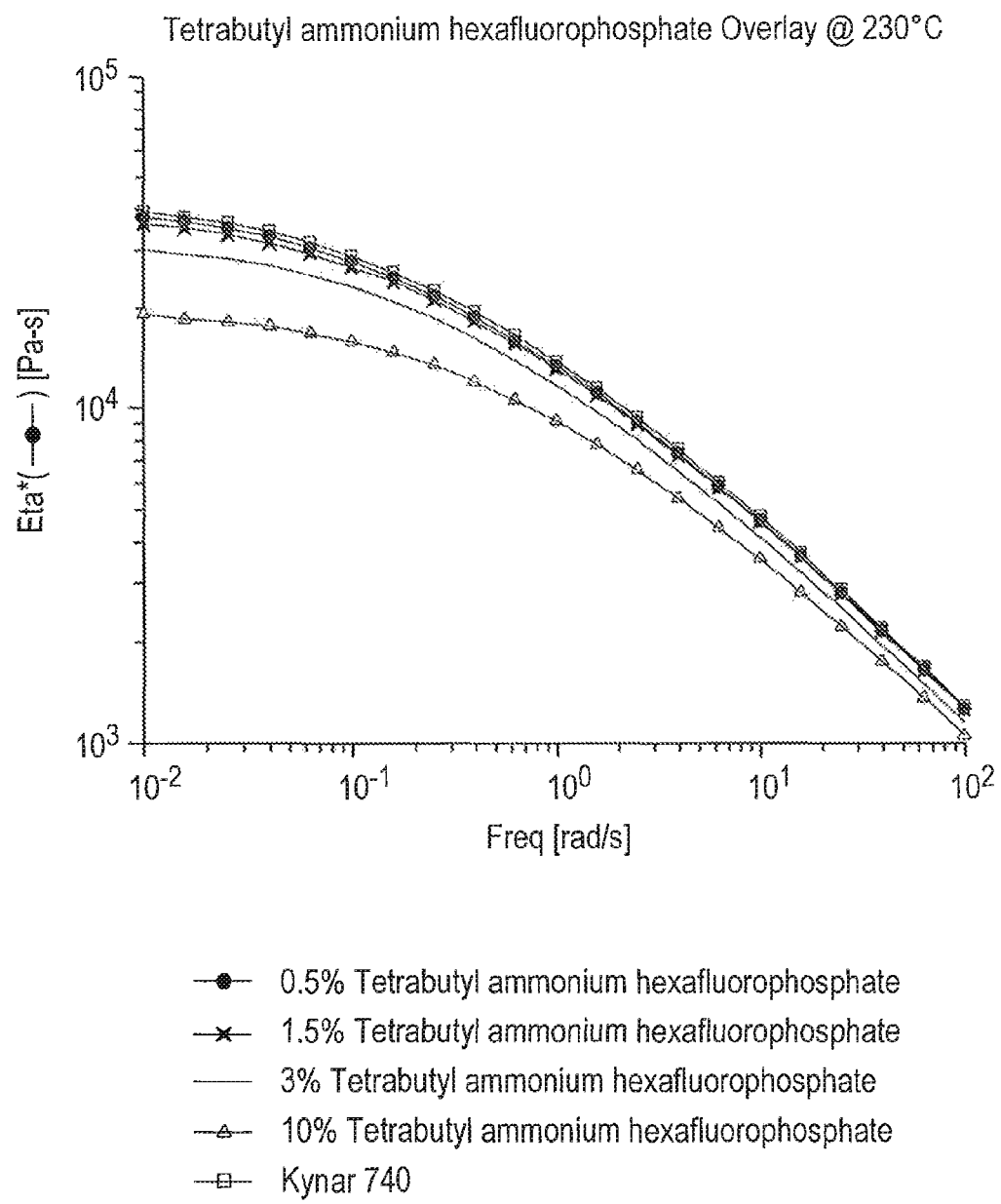
FIGS. 5-7 show the effect on low shear on PVDF modified with alkyl and aryl onium salts. The low shear effect is seen in the aryl onium, but not alkyl onium compositions.
Figure 6:
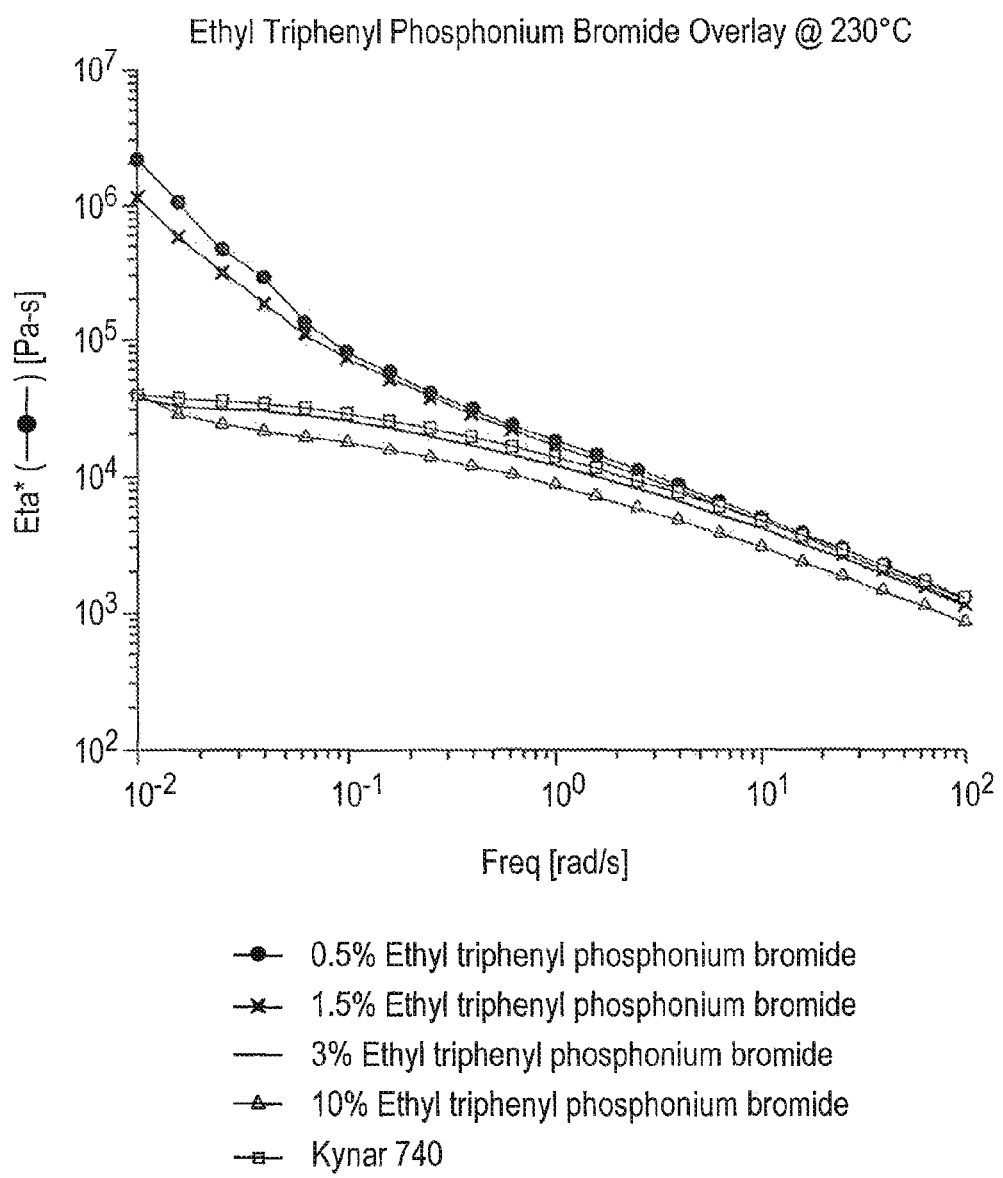
Figure 7:
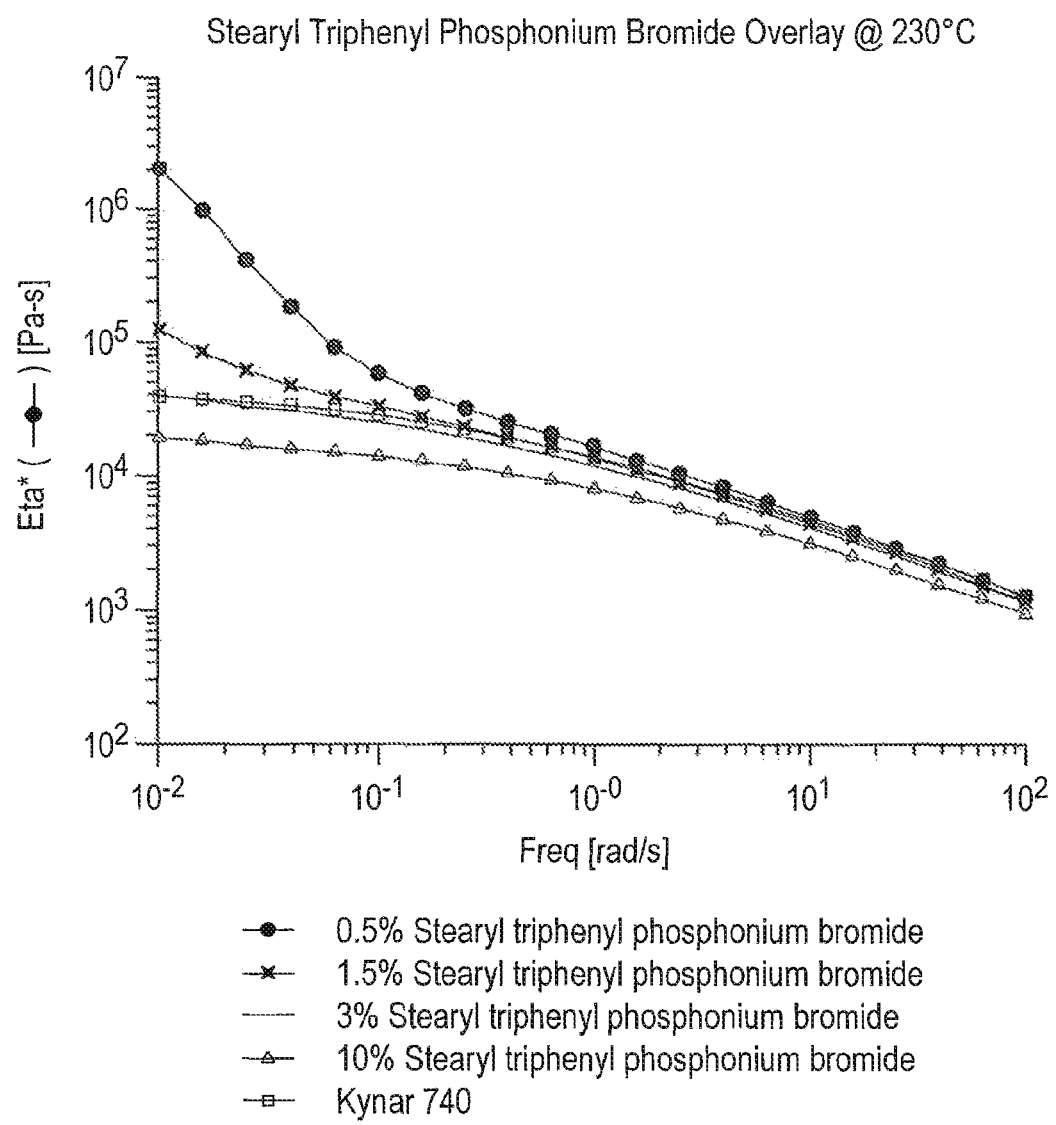

Increase in high temperature modulus (above 150° C.) can be noted with annealing. As noted in the FIG. 4, a higher temperature modulus can be seen as compared to the homopolymer control that contained no salt. Samples were of those mixed on the Werner Pfleiderer. Sample pellets were heated under pressure at 230° C. for five minutes to form fused bars. Bars were then tested in the Rheometric Scientific RDA III strain rheometer using the torsion rectangular geometry with approximate sample dimensions of $2 \times \frac{1}{2} \times \frac{1}{16}$ in$^3$. Testing was performed at a frequency of 1 Hz, heating rate of 5° C./min, with a strain of 0.03%. The homopolymer reference and samples containing 0.5% salt were tested after annealing at 170° C. for 10 minutes prior to analysis.

Example 6

The low shear rheological effect for aryl oniums, in particular aryl phosphoniums was measured, with the results plotted in FIGS. 5-8. Examples of triphenyl phosphoniums mixed with PVDF using the Werner Pfleiderer. For testing, disks were pressed and the measurements were made using a rotational rheometer at 230° C. in parallel plate geometry. The alkyl onium (FIG. 5) did not show the low shear rheological effect. The importance of this effect is to improve melt strength for foam, blown film, blow molding, and wire and cable applications.

Example 7

Samples of PVDF modified with onium salts were made and DSC was performed by heating 10° C./min after cooling 10° C./min through a temperature range of −20 to 210° C. The DMA testing was performed at a frequency of 1 Hz, heating rate of 5° C./min, with a strain of 0.03%. It is shown that the melting point decreases and the glass transition increases, as shown in FIG. 11.

As noted below there is a decrease in the melting point as noted by DSC from a high for the 0.5% weight percent as a reference though an increase over the neat homopolymer may still be noted for most compositions. An increase in the glass transition as noted in the Tan δ DMA curve when the salt is added above 1.5 weight percent, as shown in FIG. 12.

What is claimed is:

1. An annealed polyvinylidene fluoride (PVDF) composition in the form of a film comprising:

a) a polyvinylidene fluoride homopolymer, copolymer or terpolymer, and
b) from 0.1 to 20 weight percent of an organically-modified nanoclay based on the weight of the polyvinylidene fluoride polymer and organically-modified nanoclay, wherein said nanoclay platelet surfaces are modified with one or more onium salts, said onium salt having the formula:

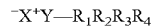

wherein X is an anionic center; Y is a cationic center formed from the addition of radicals that create four bonds to that center and may be either a heterocyclic imidazolium $^+N{=}R_1(R_2R_3)$, a quaternary ammonium, $^+NR_1R_2R_3R_4$, or a phosphonium $^+PR_1R_2R_3R_4$; and $R_1$, $R_2$, $R_3$, and $R_4$ are each individually H or a $C_{1-20}$ group selected from alkyl, aryl, alkylaryl, alkylaryl radicals; wherein said film is piezoelectric, wherein said film is poled and non-stretched, and wherein said composition is annealed at from 130° C. to 180° C. for at least 1 minute after formation of the film.

2. The polyvinylidene fluoride composition of claim 1, wherein said polyvinylidene fluoride polymer comprises a polyvinylidene homopolymer, or a copolymer of vinylidiene fluoride and hexafluoropropylene.

3. The polyvinylidene fluoride composition of claim 1 wherein said onium salt comprises an organic portion having 1-18 carbons.

4. The polyvinylidene fluoride composition of claim 1, wherein said polyvinylidene fluoride polymer comprises a copolymer of vinylidiene fluoride and hexafluoropropylene.

5. The polyvinylidene fluoride composition of claim 1, wherein said onium salts are selected from the group consisting of phosphonium, imidazonium, and ammonium organic salts.

6. The polyvinylidene fluoride composition of claim 1, wherein said composition has a melting point of up to 15 degrees Celsius higher than an unmodified polyvinylidene fluoride polymer, copolymer or terpolymer.

7. The polyvinylidene fluoride composition of claim 6, wherein said composition has a melting point of 8 to 12 degrees Celsius higher than an unmodified polyvinylidene fluoride polymer, copolymer or terpolymer.

8. A piezoelectric film comprising the composition of claim 1.

* * * * *